(12) United States Patent
Tsurugasaki

(10) Patent No.: US 7,003,761 B2
(45) Date of Patent: Feb. 21, 2006

(54) MULTI-PROCESS DISPLAY METHOD IN DEBUGGER SYSTEM

(75) Inventor: Toshihiro Tsurugasaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 583 days.

(21) Appl. No.: 09/855,681

(22) Filed: May 16, 2001

(65) Prior Publication Data

US 2001/0044929 A1    Nov. 22, 2001

(30) Foreign Application Priority Data

May 18, 2000    (JP)    ............................. 2000-152665

(51) Int. Cl.
*G06F 9/44*    (2006.01)
(52) U.S. Cl. ................................... 717/125
(58) Field of Classification Search ........ 717/124–128; 714/38
See application file for complete search history.

(56) References Cited

U.S. PATENT DOCUMENTS

| | | | | |
|---|---|---|---|---|
| 6,016,474 A | * | 1/2000 | Kim et al. ................... | 717/125 |
| 6,438,713 B1 | * | 8/2002 | Taira et al. ................... | 714/38 |
| 6,516,460 B1 | * | 2/2003 | Merks et al. ................ | 717/124 |
| 6,598,180 B1 | * | 7/2003 | Dryfoos et al. ............... | 714/38 |

FOREIGN PATENT DOCUMENTS

| | | |
|---|---|---|
| JP | 4-235642 | 8/1992 |
| JP | 5-233323 | 9/1993 |
| JP | 5-334119 | 12/1993 |
| JP | 07-191872 | 7/1995 |
| JP | 7-200351 | 8/1995 |
| JP | 8-185340 | 7/1996 |
| JP | 11-161514 | 6/1999 |

OTHER PUBLICATIONS

Lauterbach, "Trace32 RTOS Debugger for pSOS+", http://www.lauterbach.com, 1999.*
Lauterbach Gmbh, "Trace32 RTOS Debugger", http://www.lauterbach.com, May 10, 1999.*
Timmeman, "PSOS 2.6.1. Evaluation Executive Summary", http://www.realtime-info.com, Real-Time Magazine, 1999.*

* cited by examiner

Primary Examiner—Wei Y. Zhen
(74) Attorney, Agent, or Firm—Mattingly, Stanger, Malur & Brundidge, P.C.

(57) ABSTRACT

In a multi-process display method of displaying processes to be debugged in a debugger system, an operation state change and detailed information of each process are acquired, each process is displayed using a predetermined pattern, a relationship between the processes is displayed using a layout of patterns and lines therebetween, the current operation state of each process is displayed using a particular display mode for the pattern, and the detailed information of each process is displayed.

11 Claims, 9 Drawing Sheets

~300

| | | | |
|---|---|---|---|
| 310 ~ | DEBUG PROCESS INFORMATION | NODE NO. INFORMATION | ~311 |
| | | PROCESS NO. INFORMATION | ~312 |
| | | PROGRAM NAME INFORMATION | ~313 |
| | | OPERATION STATE INFORMATION | ~314 |
| 340 ~ | PROCESS BOX COORDINATE POSITION INFORMATION | X-AXIS INFORMATION | ~341 |
| | | Y-AXIS INFORMATION | ~342 |
| | | WIDTH INFORMATION | ~343 |
| | | HEIGHT INFORMATION | ~344 |
| 320 ~ | CHILD DEBUG PROCESS INFORMATION | CHILD PROCESS INFORMATION POINTER | ~321 |
| 330 ~ | BROTHER DEBUG PROCESS INFORMATION | BROTHER PROCESS INFORMATION POINTER | ~331 |

FIG.3

| | | | |
|---|---|---|---|
| 310 | DEBUG PROCESS INFORMATION | NODE NO. INFORMATION | 311 |
| | | PROCESS NO. INFORMATION | 312 |
| | | PROGRAM NAME INFORMATION | 313 |
| | | OPERATION STATE INFORMATION | 314 |
| 340 | PROCESS BOX COORDINATE POSITION INFORMATION | X-AXIS INFORMATION | 341 |
| | | Y-AXIS INFORMATION | 342 |
| | | WIDTH INFORMATION | 343 |
| | | HEIGHT INFORMATION | 344 |
| 320 | CHILD DEBUG PROCESS INFORMATION | CHILD PROCESS INFORMATION POINTER | 321 |
| 330 | BROTHER DEBUG PROCESS INFORMATION | BROTHER PROCESS INFORMATION POINTER | 331 |

(300)

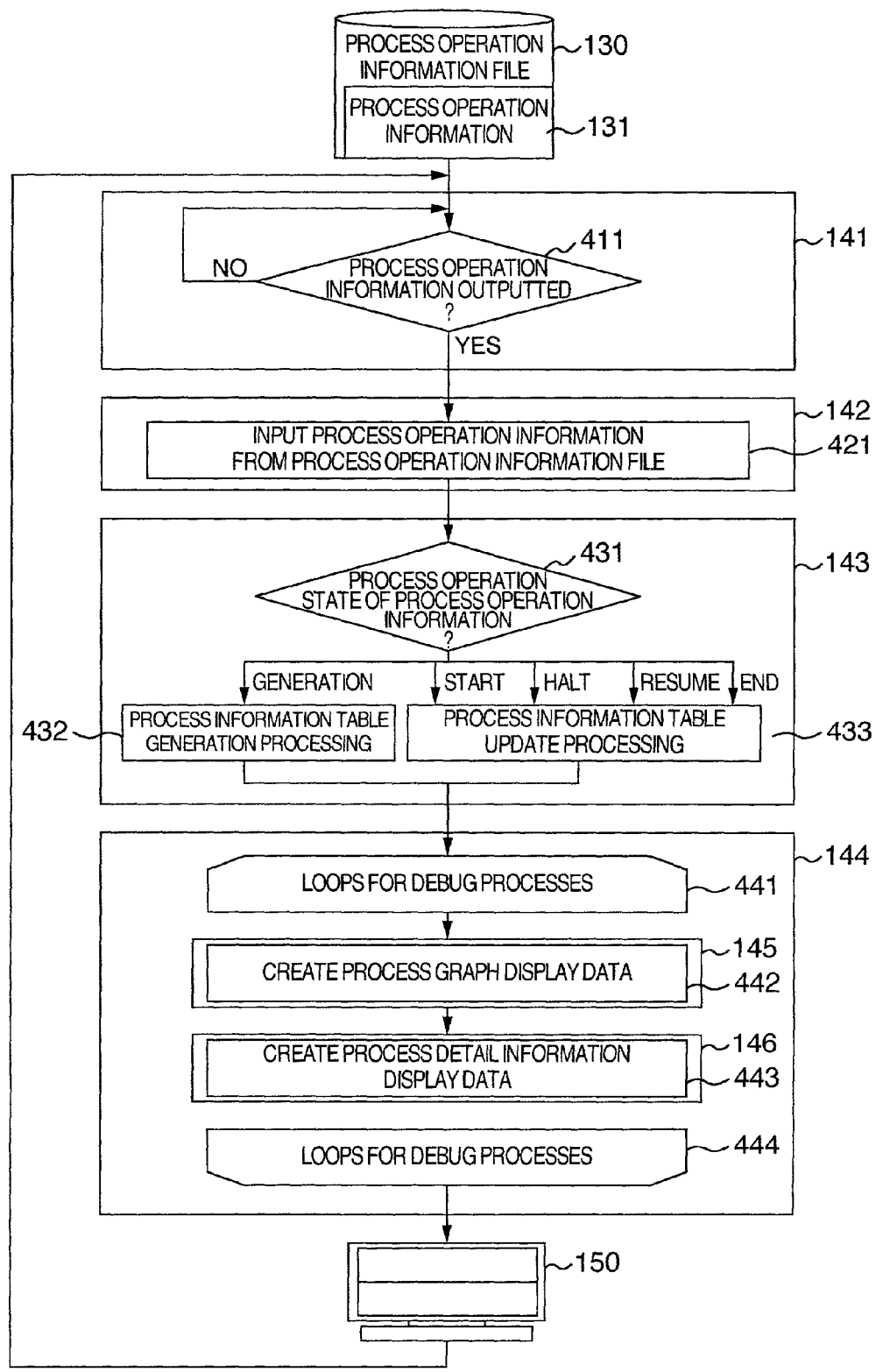

MULTI-PROCESS DISPLAY METHOD IN DEBUGGER SYSTEM

BACKGROUND OF THE INVENTION

The present invention relates to a multi-process display method of displaying multiple processes to be debugged in a debugger system, a debugger system, and a storage medium having stored thereon a display program, and in particular, to a method of and a system for debugging a multi-process program in which changes in operation states of processes of a multi-process program are displayed in relation to operation of the program to thereby support the debugging.

Various methods have been devised to support debugging of a program. For example, JP-A-5-233323 describes a method to interactively and efficiently debug a parallel program. JP-A-8-185340 describes a parallel program visualizing method as a tool to visualize a parallel program. However, the techniques of the prior art does not have a function to clearly and visually display such relationships between processes of a parallel program as a parent-child relationship and a brother relationship. None of the techniques has a function to clearly display operation states of processes such as "generation", "start", "resume", "halt", and "end". JP-A-11-161514 describes a debugging method of a program including a plurality of processes, but has not a function to debug processes of the program in relation to operation of the program.

SUMMARY OF THE INVENTION

It is therefore an object of the present invention to provide a multi-process display method, a debugger system, and a recording medium having stored thereon a display program to efficiently debug a multi-process program.

The object according to the present invention can be achieved by paying attention to a point in which debug information of a relationship between operation states of a plurality of processes of a multi-process program is clearly displayed in relation to operation of the program and a point in which a relationship between processes in operation and processes already ended is visually and discriminatively displayed. Resultantly, it is possible to provided a debug support method and a debug support system capable of efficiently debugging a multi-process program including a plurality of processes.

To achieve the object according to the present invention, there is provided a multi-process display method of displaying processes to be debugged in the debugger system in which the debugger system acquires an operation state change and detailed information of each process, displays each process using a predetermined pattern, displays a relationship between processes using a layout of the patterns and lines connecting the patterns to each other, displaying an operation state of each process using a particular display mode of a pattern, and displays detailed information of each process.

BRIEF DESCRIPTION OF THE DRAWINGS

The present invention will be more apparent from the following detailed description, when taken in conjunction with the accompanying drawings, in which:

FIG. 3 is a table showing details of process information;

FIG. 4 is a flowchart showing a processing procedure of a debugger information display section;

DESCRIPTION OF THE EMBODIMENTS

Referring now to the accompanying drawings, description will be given of an embodiment according to the present invention.

Figure 1:
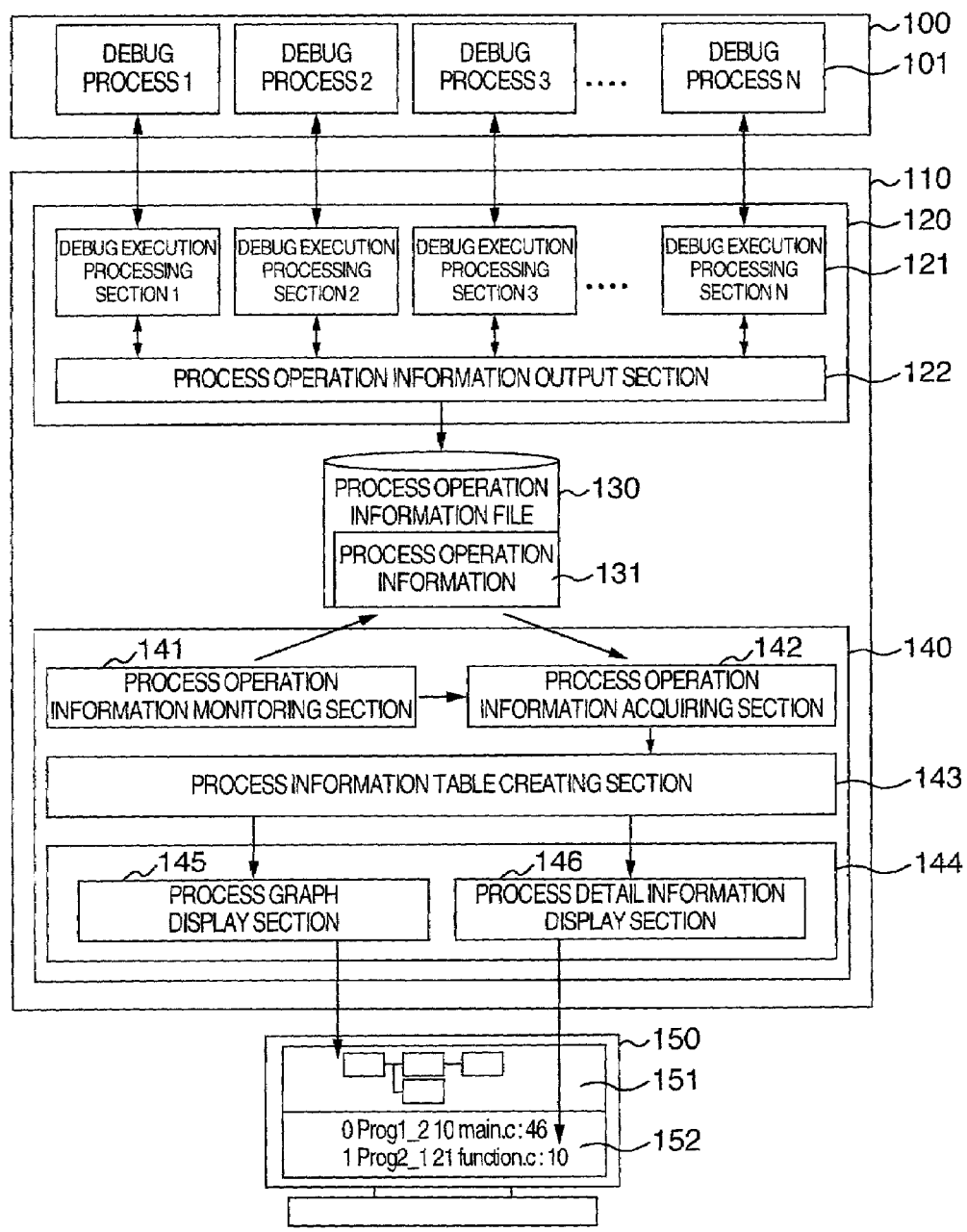
FIG. 1 is a diagram showing a configuration of a debugger system according to the present invention.

FIG. 1 shows a configuration of a debugger system in a block diagram. The configuration includes a program 100 to be debugged (to be referred to as a debug program herebelow). The debugger system includes a debugger system section 110 and a display 150. The debug program 100 includes a plurality of processes (to be referred to as debug processes herebelow) constituting the program 100. The processes are application programs prepared by users. When the user compiles a source program or code with a specification of "debug option", processes are generated in a format suitable for the debugger system. That is, in each process, when an operation state is changed or when a particular system call is issued, an interruption signal is created to output information related to the debugging.

The debugger system section 110 includes a debugger engine section 120 which controls execution of the debug program 100 and which monitors the execution thereof and a debugger information display section 140 to display an operation state of the program 100 on the display 150.

The debugger system section 110 is activated by a command from a user. After activating the section 110, the user inputs to the section 110 a command or the like to determine a break point (at which execution of a program is temporarily stopped) for the debug program. The user then inputs a command to execute the debug program. The debug program stops execution at a predetermined break point and a particular system call and passes control to the debugger system section 110. The user checks an operation state of each process and values of data and variables by commands. Thereafter, when the user issues an instruction to resume a process, the execution of the debugger program is resumed. In this way, the debugger system section 110 provides an interface for the user to interactively execute the debug program.

The debugger engine section 120 includes a debug execution processing section 121 which controls execution of the debug program 100 for each debug process 101 and which monitors the execution and a process operation information output section 122. When an operation state of the debug process 101 changes, the debug execution processing section 121 detects an interruption signal from the debug process 101 and transfers control to the process operation information output section 122. The output section 122 outputs process operation information 131 to a process operation information file 130. Details of the information 131 will be described later by referring to FIG. 2. A process operation information monitoring section 141 makes a check to determine presence or absence of the output of the process operation information 131 to the file 130 to change a display state of the display 150 in relation to operation of the debug process 101. If the information 131 is outputted to the file 130, the monitoring section 141 passes control to a process operation information acquiring section 142. The section 142 receives the process operation information 131 from the file 130 and then passes control to a process information table creating section 143. Using the process operation information 131, the section 143 creates and updates a process information table to control the debug process 101 and passes control to a process information display section 144. Details of the process information table will be described later by referring to FIG. 3. The process information display section 144 includes a process graph display section 145 and a process detail information display section 146. The section 144 refers to the process information table created and updated by the table creating section 143 and displays a process graph 151 and process detail information 152 on the display 150.

The debugger engine section 120 and the debugger information display section 140 of the debugger system 110 are respectively software programs. Each part of the sections 120 and 140 is implemented using a subroutine. The process operation information file 130 and the process information table are respectively tables in a main memory. The implementation above is only an example, that is, the sections 120 and 140, the file 130, and the process information table can be implemented in other than this way.

Figure 2:
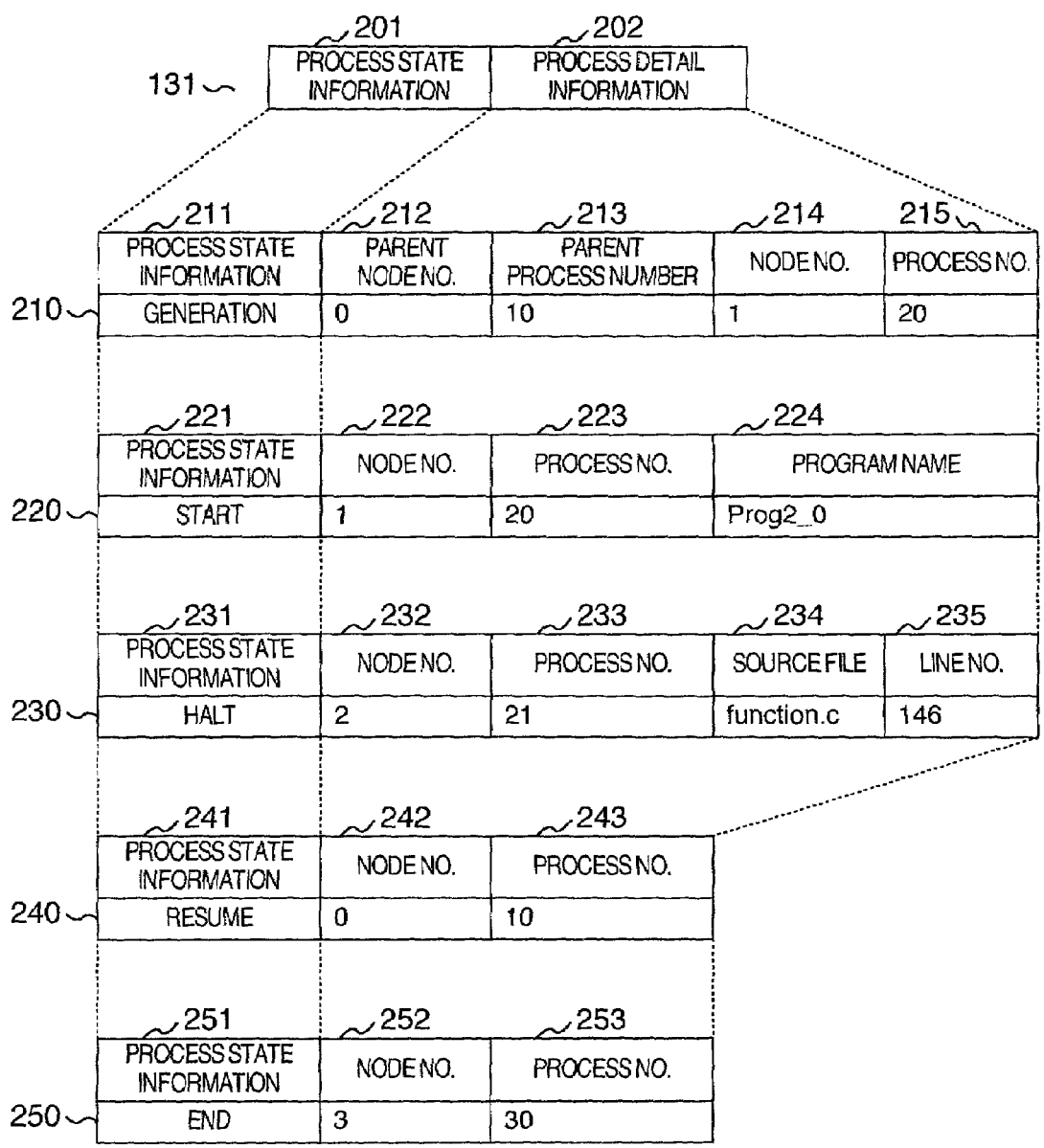
FIG. 2 is a diagram showing a data layout of operation states of processes.

FIG. 2 shows a data layout of the process operation information 131.

The process operation information file 130 to store the process operation information 131 has a queue configuration of first-in-first-out (FIFO) type. The process operation information output section 122 enqueues in the process operation information file 130 the process operation information 131 in either one of the layouts 210, 220, 230, 240, and 250 shown in FIG. 2. The operation information monitoring section 141 monitors the information and the process operation information acquiring section 142 dequeues the information from the file 130. The process operation information 131 includes process state information 201 and process detail information 202. The information 201 indicates an operation state of the debug process 101. The information 202 is disposed to control information associated with the process state information such as a number (to be referred to as a node number) sequentially assigned to the debug process 101 by the debugger engine section 120, a process number (assigned to the debug process 101 by an operating system (OS)), a program name, and source file information at a halt position. The process operation information 210 is an example of the process operation information 131 when a new debug process 101 is created (corresponding to a system call "fork"). This means that a debug process with node number "1" 214 and process number "20" 215 is created from a debug process with node number "0" 212 and process number "10" 213. The process operation information 220 is an example of the process operation information 131 when operation of the process is executed (corresponding to a system call "exec"). This means that execution of program name "Prog2_0" 224 is started in a debug process with node number "1" 222 and process number "20" 223. The process operation information 230 is an example of the process operation information 131 when operation of the process is halted, for example, by a break point set by the user. This means that a debug process with node number "2" 232 and process number "21" 233 is halted at line number "146" 235 of a source file "function.c" 234. The process operation information 240 is an example of the process operation information 131 when the operation of the debug process is resumed. This means that the operation of a debug process with node number "0" 242 and process number "10" 243 is resumed. The process operation information 250 is an output example of the process operation information 131 when the operation of the debug process is ended. This means that the operation of a debug process with node number "3" 252 and process number "30" 253 is ended.

FIG. 3 shows details of the process information table 300 which is created and updated by the process information table creating section 143 and which is referred to by the process graph display section 145 and the process detail information display section 146. One process information table is created for each of the debug processes created up to the pertinent point time. The information table 300 of each process includes debug process information 310, process box coordinate position information 340, child debug process information 320, and brother debug process information 330. The debug process information 310 includes node number information 311, process number information 312, program name information 313, and operation state information 314. The process box coordinate position information 340 includes information of coordinates when a debug process managed by the process information table 300 is displayed as a process box in a process graph, that is, x-axis information 341, y-axis information 342, width information 343, and height information 344 of the process box. The child debug process information 320 is a process information table pointer 321 to a debug process (to be referred to as a child process herebelow) created by the debug process managed by the process information table 300. The brother debug process information 330 is a process information table pointer 331 to a debug process (to be referred to as a brother process herebelow) which is a brother of the debug process managed by the process information table 300.

Figure 5:
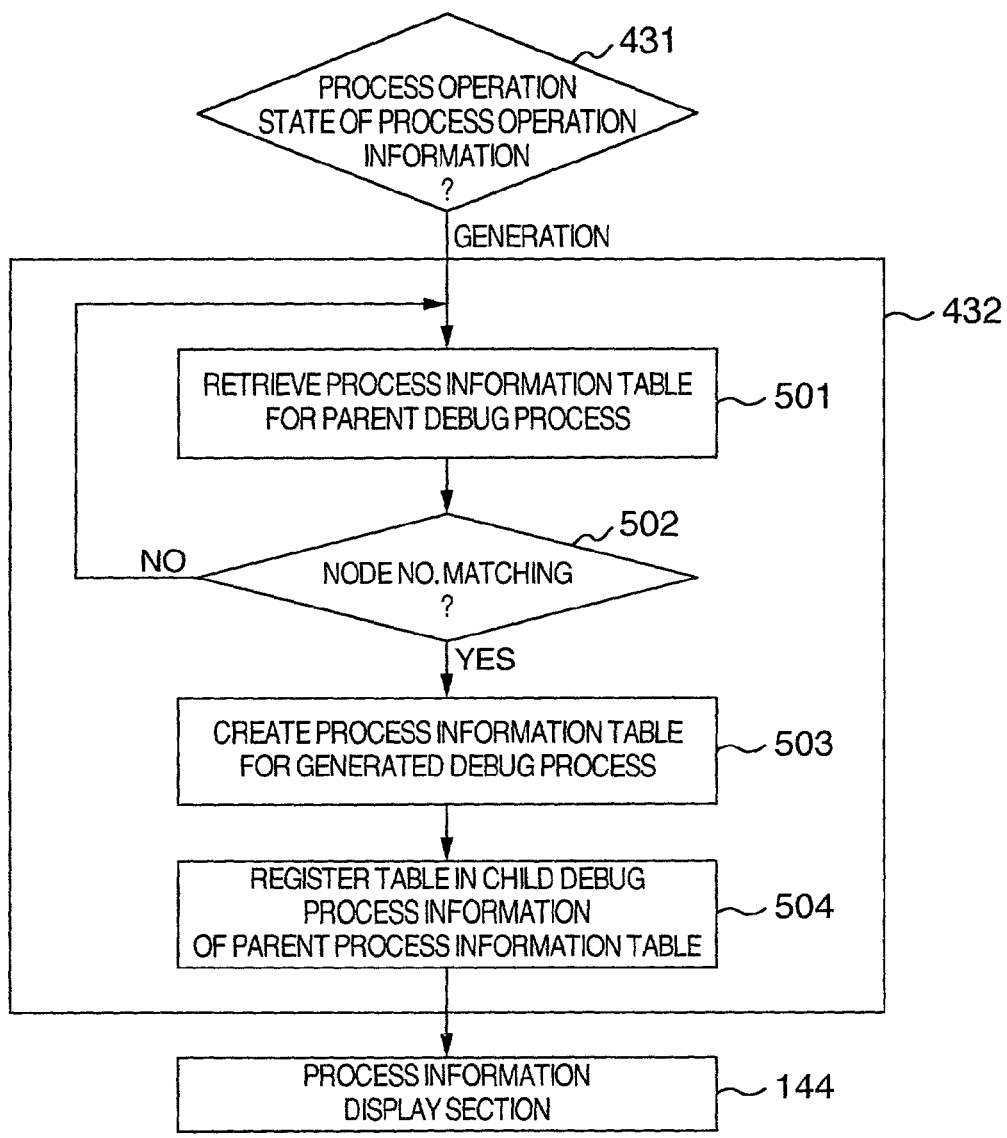
FIG. 5 is a flowchart showing in detail an embodiment of a processing flow to create a process information table.
Figure 6:
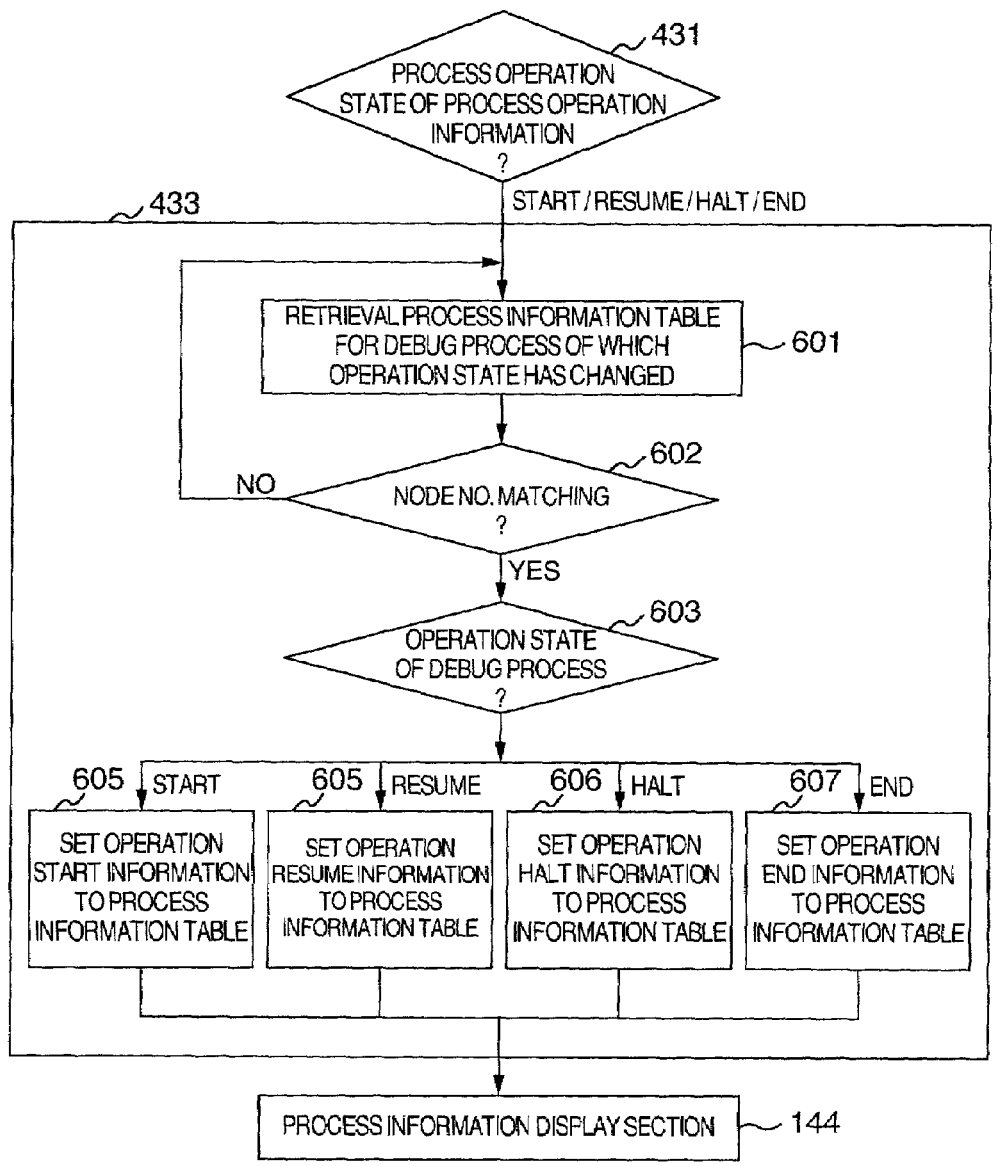
FIG. 6 is a flowchart showing in detail an embodiment of a processing flow to update a process information table.

FIG. 4 is a flowchart of a processing procedure of the debugger information display section 140 to display on the display 150 the process operation information 131 received from the process operation information file 130. First, the process operation information monitoring section 141 periodically makes a check to determine whether or not the process operation information 131 is outputted to the file 130 (step 411). If the information 131 is outputted, the monitoring section 141 passes control to the process operation information acquiring section 142. The section 142 dequeues the information 131 from the file 130 (step 421) and passes control to the process information table creating section 143. The section 143 obtains an operation state of the debug process from the process state information 201 of the process operation information 131 (step 431). When the information 201 indicates a debug process generation state, a process information table is created (step 432). When the information 201 indicates a debug process start, resume, halt, or end state, the process information table is updated (step 433). Control is the passed to the process information display section 144. FIG. 5 shows an embodiment of the process information generation processing 432 in detail. FIG. 6 shows details of the process information update processing 433. Using the process information table, the process information display section 144 repeatedly executes processing 442 to create data to display a process graph in the process graph display section 145 and processing 443 to create data to display process detail information in the process detail information display section 146 as many times as debug process number (steps 441 to 444). The process information display section 144 resultantly display the process graph and the process detail information on the display 150. Embodiments of the process graph display data generation processing 442 and the process detail information display data generation processing 443 will be specifically described later by referring to FIG. 7. After the graph and the information are displayed, steps 411 to 444 are repetitiously executed.

FIG. 5 shows a specific embodiment of the process information table generation processing 432. Description will be given of a case in which the process operation information 210 described by referring to FIG. 2 is inputted to the processing 432. The program first retrieves a process information table managing a debug process (a debug process with node number "0" 212 and process number "10" 213 in this example and will be referred to as a parent process herebelow) having created a new debug process 101 (step 501). The retrieval is carried out by determining whether or not the node number (node number "0" 212) of the parent process matches node number information in the process information table (step 502). When the process information table managing the parent process is retrieved, the program creates a process information table of the new debug process (a debug process with node number "1" 214 and process number "20" 214 in this example and will be referred to as a child process herebelow; step 503) and registers to the child debug process information in the process information table of the parent process. Simultaneously, the program also registers brother debug process information and then passes control to the process information display section 144.

FIG. 6 shows a concrete embodiment of the process information table update processing 433. Description will be given of a case in which the process operation information 230 is inputted to the update processing 433 when the operation is halted, for example, at a break point shown in FIG. 2. First, the program retrieves a process information table managing the debug process of which the operation is halted (the debug process with node number "2" 232 and process number "21" 233 in this example; step 601). The retrieval is carried out by determining whether or not the node number (node number "2" 233) of the debug process matches node number information in the process information table (step 602). When the process information table managing the debug process is retrieved, the program determines an operation state of the debug process according to the process state information 231 of the process operation information 230 (step 603). Since the process state information 231 of the process operation information 230 indicates "operation halt" in this case, the program sets operation halt information to the operation state information of the process information table managing the debug process (step 606) and passes control to the process information display section 144. Similarly, when the process operation information 220 is inputted, the program sets operation start information to the operation state information (step 604). When the process operation information 240 is inputted, the program sets operation resume information to the operation state information (step 605). When the process operation information 250 is inputted, the program sets operation end information to the operation state information (step 607). The program then passes control to the process information display section 144.

Figure 7:
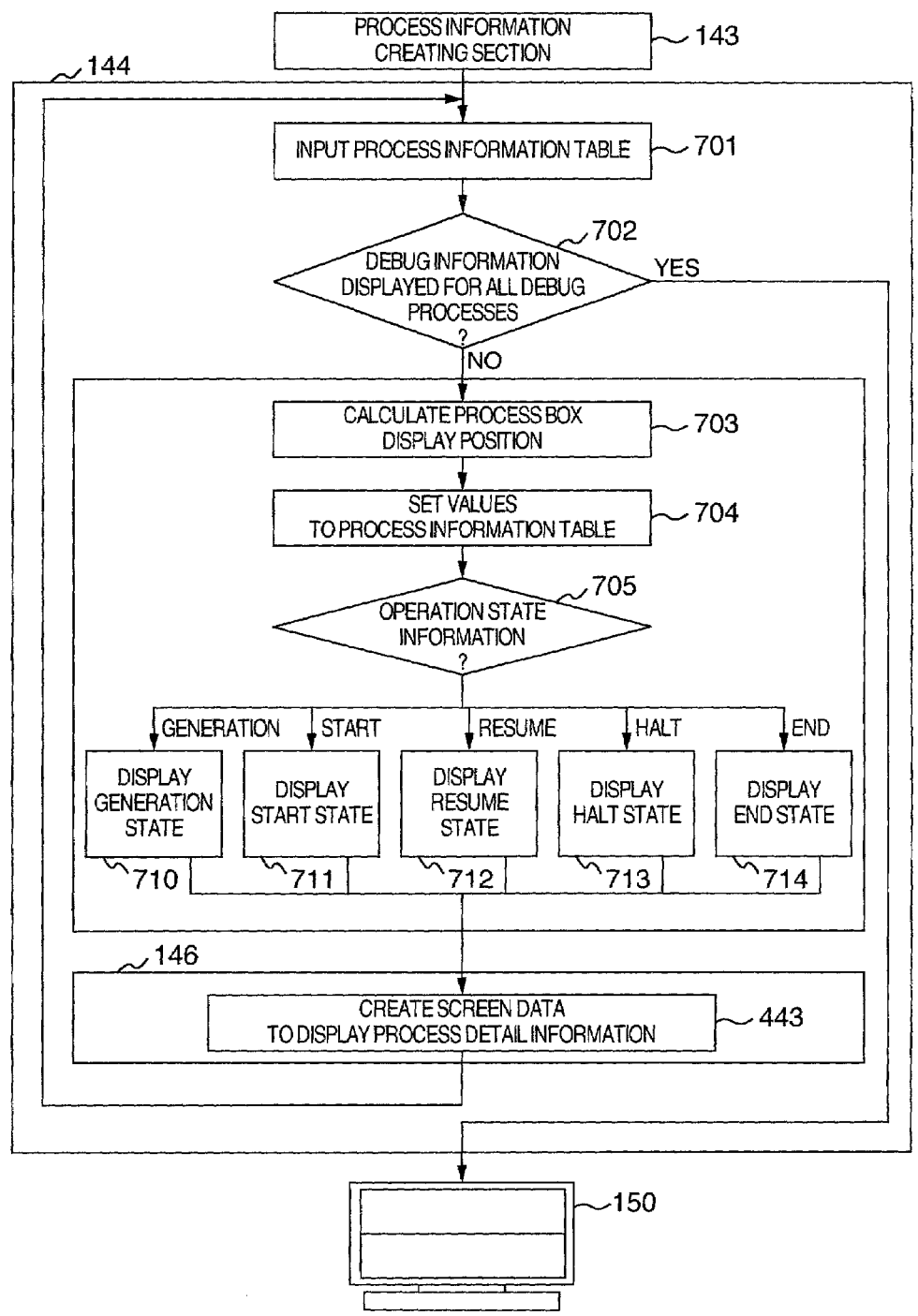
FIG. 7 is a flowchart showing in detail an embodiment of a process information display section.

FIG. 7 is a specific embodiment of the process information display section 144. The program first reads a process information table created and updated by the process information table creating section 143 (step 701) and makes a check to determine whether or not the debug information display processing has been completely executed for all debug processes (step 702). If the processing has been completely executed, the program passes control to the display 150. Since the process graph display section 145 displays a debug process in the form of a process box, the process information display section 144 calculates process box display position information (x-axis, y-axis, width, and height information; step 703) and sets the values resultant from the calculation to the process box coordinate position information of the process information table (step 704). The process box is fixed in size in principle. The display section 145 arranges the process boxes in a screen memory with a fixed interval therebetween such that processes having a parent-child relationship are horizontally disposed and processes of brothers are vertically disposed. To display the process boxes in relation to operation states (generation, start, resume, halt, and end) of the respective debug processes, the display section 145 refers to the operation state information of the process information table (step 705), creates process box display screen data according to the operation state (step 710, 711, 712, 713, or 714), and then passes control to the process detail information display section 146. The display section 146 creates screen data to display process detail information (step 443).

Figure 8:
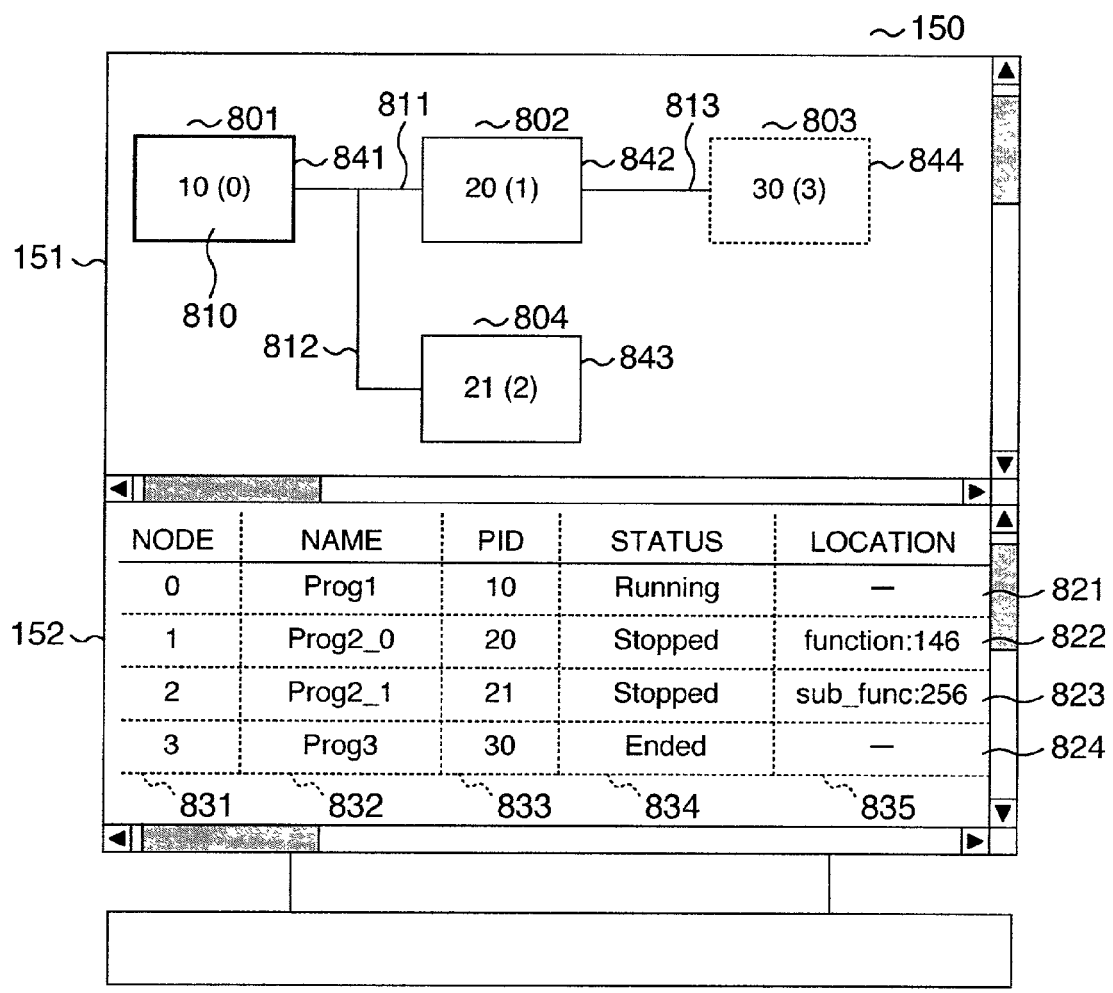
FIG. 8 is a diagram showing a display example of a process graph and process detail information displayed on a display.

FIG. 8 shows a display example of a process graph 151 and process detail information 152 displayed on one screen of the display 150. For the process boxes 801 to 804 displayed in the process graph 151, debug process information, i.e., a process number (node number) of debug process information is displayed as information to indicate each debug process. For example, debug process information 810 of a process box 801 indicates that the debug process has process number "10" (node number "0"). Since the process box 801 is linked by a line 811 with the process box 802, the process box 801 is a parent process having generated a debug process indicated by the process box 802. The process box 801 is also linked by a line 812 with the process box 804, and hence the process box 801 is a parent process having generated a debug process indicated by the process box 804. It is accordingly to be appreciated that the process boxes 802 and 804 are bother processes. The process box 802 is linked by a line 813 with the process box 803 and hence is a parent process having generated the debug process indicated by the process box 803. Neither of the process boxes 803 and 804 is linked rightward by a line with another process box. Therefore, neither thereof has generated a child process. The debug process of the process box 801 is displayed with bold lines (841). This indicates that the debug process is in the operation resume state. The processes respectively of the process boxes 802 and 804 are displayed with ordinary lines (842, 843). This indicates that the debug processes are in the operation halt state. The process of the process box 803 is displayed with dotted lines (843). This indicates that the debug process is in the execution end state. As above, the process boxes are displayed according to the operation states of the respective processes. The process detail information 152 is debug information which includes information of rows such as detailed operation information 821 to 824 of the debug processes and information of columns such as a node number 831, a program name 832, a process number 833, an operation state 834, and a halt location 835.

As shown in FIG. 8, a process graph 151 and a process detail information 152 can be independently moved in the vertical and horizontal directions. In the example of FIG. 8, the graph 151 and the information 152 are vertically arranged to respectively occupy an upper half and a lower half of the screen. However, they may be displayed in different windows such that either one thereof are displayed on the screen or both thereof are displayed in a partially overlapped state. There may be disposed another window to input debug commands.

Figure 9:
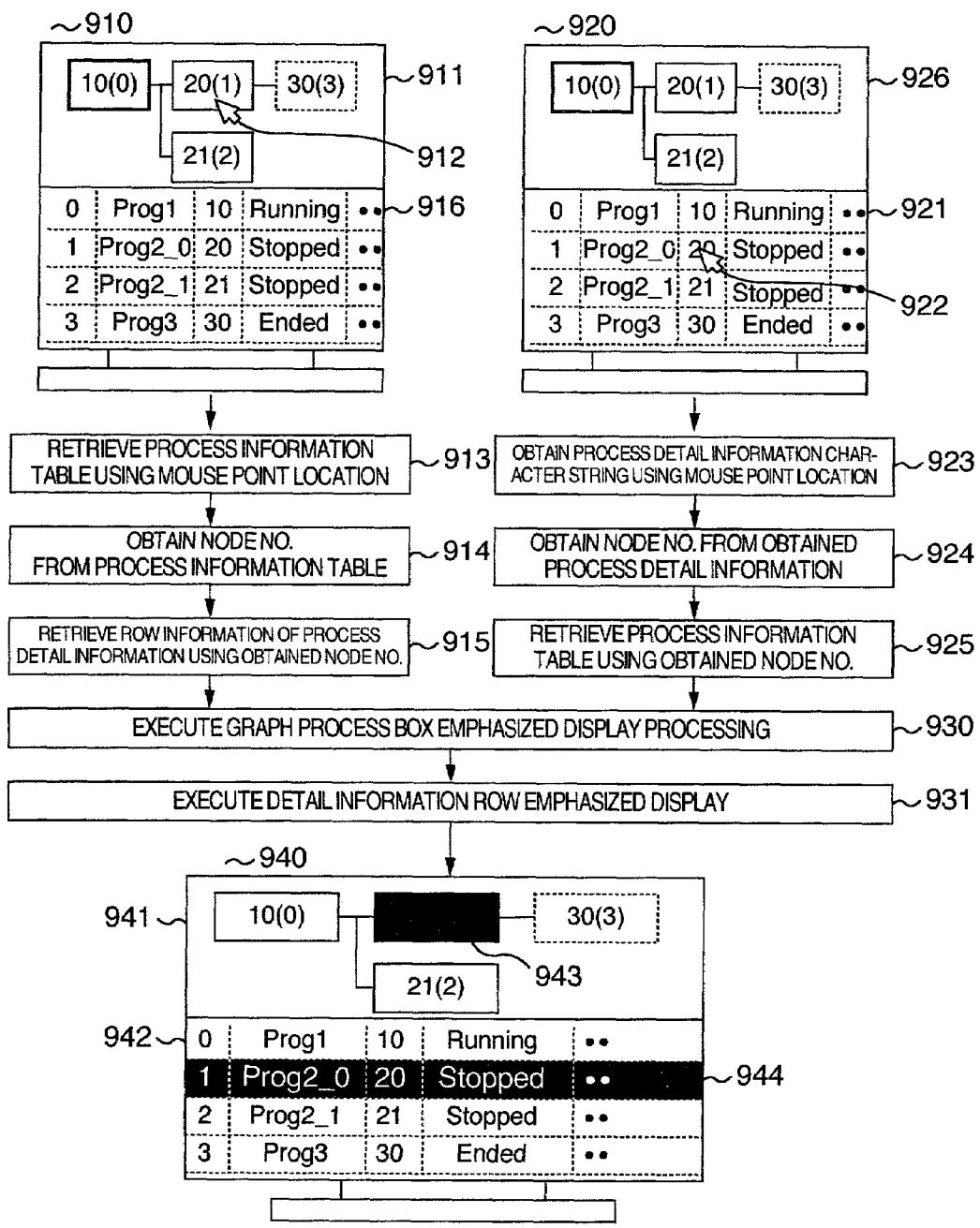
FIG. 9 is a diagram showing a procedure to display a process graph and process detail information in an emphasized mode.

FIG. 9 shows a procedure to conduct an operation 910 for a debug state selection state (to be referred to as an emphasized display) of a particular debug process from a process graph 911 and a procedure to conduct an operation 920 for a debug information emphasized display of a particular debug process.

The flow shown in FIG. 9 is a part of the process information display section 144. The flow is activated by the operation of a mouse or a keyboard on the process graph 151 or the process detail information 152.

The emphasized display operation 910 from the process graph 911 is explained. When the debug information emphasized display operation 912 is carried out for a debug process with process number "20" (node number "1") using a mouse or the like from the process graph 911, the program retrieves, according to a point location of the mouse and coordinate information managed by the process box coordinate position information of the process information table, a process information table of a debug process displayed as a process box at the mouse point location (step 913). From the retrieved process information table, it is known that the debug process for which the emphasized display operation is conducted has a node number "1" (step 914). Using the node number as a key, a retrieval is conducted through the process detail information rows displayed in the process detail information 916 to detect information row having a node number "1" (step 915). Process box emphasized display processing (step 930) is executed using process box coordinate position information of the process information table retrieved by the process information table retrieval (step 913). Emphasis display processing of the process detail information is executed according to information in the detected row (step 931). Resultantly, a process box 943 indicating node number "1" of a process graph 941 and process detail information row 944 indicating the debug process with node number "1" of process detail information 942 are emphasized in the presentation on a display 940 in a related fashion. Next, an emphasized display operation 920 from the process detail information 921 is explained. When a debug information emphasized display operation 922 of the debug process with process number "20" and node number "1" is conducted from the process detail information 921 using, for example, a mouse; a character string indicating, as row information, detailed information of the debug process is acquired using the mouse point location (step 923) and a node number is obtained from the acquired character string (step 924). Using the obtained node number as a key, the program retrieves a process information table managing the debug process for which the emphasized display operation has been conducted (step 925). As in the emphasized display operation 910 from the process graph, a process box 943 indicating the debug process with node number "1" of the process graph 941 and process detail information 944 indicating the debug process with node number "1" of process detail information 942 are displayed on the display 940 in an emphasized mode in a related fashion.

In FIG. 9, a reverse display mode is adopted for the emphasized display. However, the width and the color of the characters and the process boxes may be changed for this purpose.

The process graph 151 and the process detail information 152 are kept displayed until execution of all processes is finished and the user instructs the debugger system to end its operation.

A variation of the embodiment will be next described.

In the embodiment, the process operation information output section 122 outputs the process operation information 131 to the file operation information file 130. The process operation information monitoring section 141 monitors by polling the process operation information 131. In place of the processing, it may be conducted that using a task queue or an inter-task communication, the process operation information output section 122 directly passes the process operation information 131 to the process operation information acquiring section 142 and simultaneously triggers the start of the information acquiring section 142.

The specification and drawings are, accordingly, to be regarded in an illustrative rather than a restrictive sense. It will, however, be evident that various modifications and changes may be made thereto without departing from the broader spirit and scope of the invention as set forth in the claims.

What is claimed is:

1. A multi-process display method of displaying processes to be debugged in a debugger system; comprising the steps of:
   monitoring and detecting an operation state change of each of the processes to be debugged;
   acquiring the detected operation state change of each process into the debugger system;
   representing each process using a predetermined graphic symbol;
   representing a relationship between the processes using a layout of graphic symbols and lines therebetween, the graphic symbol corresponding to the process and the line representing a parent-child or a brother relationship between the processes;
   representing the operation state of each process using a particular display mode for the graphic symbol; and
   updating the display mode for the graphic symbol indicating the operation state of each process when detecting the operation state change.

2. A multi-process display method according to claim 1, further comprising the step of acquiring detailed information of each process together with the operation state change thereof into the debugger system and displaying and updating, when detecting the operation state change, the detailed information.

3. A multi-process display method according to claim 2, further comprising the steps of:
   storing an operation state change reported from each process in a table for each process,
   wherein the operation state change is detected by monitoring the table.

4. A multi-process display method according to claim 2, wherein the operation state display and the detailed information display related to the operation state are conducted on one screen.

5. A multi-process display method according to claim 2, wherein the operation state display and the detailed information display related to the operation state are performed, in response to operation of a mouse/keyboard indicating one of the processes on either one of the displays, in an emphasized mode in relation to each other.

6. A multi-process display method according to claim 1, wherein the operation states of each process include generation, start, halt, resume, and end of the process.

7. A multi-process display method according to claim 6, wherein the graphic symbol representing the process is a rectangle and the particular display mode representing the operation state corresponds to a frame type of the rectangle.

8. A multi-process display method according to claim 7, wherein the stated or resumed process is drawn with a bold-line frame, the halted process is drawn with a thin-line frame that is thinner than said bold-line frame, and the ended process is drawn with a dotted-line frame.

9. A debugger system, comprising:
  means for monitoring and detecting an operation state change of each process of multiple processes to be debugged;
  means for acquiring the detected operation state change; and
  display means for displaying each process using a predetermined graphic symbol, displaying a relationship between the processes using a layout of graphic symbol and lines therebetween, the graphic symbol corresponding to the process and the line representing a parent-child or a brother relationship between the processes, and displaying the operation state of each process using a particular display mode for the graphic symbol, and updating the display mode for the graphic symbol indicating the operation state of each process when detecting the operation state change.

10. A debugger system according to claim 9, further comprising detailed information display means for acquiring detailed information of each process together with the operation state change thereof into the debugger system and displaying and updating, when detecting the operation state change, the detailed information.

11. A program stored on a storage medium storing instructions executable by a machine to perform method steps for debugging multi-processes, said method steps comprising steps of:
  monitoring and detecting an operation state change of each process of multiple processes to be debugged;
  acquiring the detected operation state change and detailed information of each process into the debugger system;
  displaying each process using a predetermined graphic symbol;
  displaying a relationship between the processes using a layout of graphic symbols and lines therebetween, the graphic symbol corresponding to the process and the line representing a parent-child or a brother relationship between the processes;
  displaying the operation state of each process using a particular display mode for the graphic symbol;
  displaying the detailed information of each process; and
  updating the display mode for the graphic symbol indicating the operation state of each process and the detailed information when detecting the operation state change.

* * * * *